(12) United States Patent
Ide

(10) Patent No.: US 10,435,954 B1
(45) Date of Patent: Oct. 8, 2019

(54) FLEXIBLE COUPLING

(71) Applicant: Russell D. Ide, Charlestown, RI (US)

(72) Inventor: Russell D. Ide, Charlestown, RI (US)

( * ) Notice: Subject to any disclaimer, the term of this patent is extended or adjusted under 35 U.S.C. 154(b) by 0 days.

(21) Appl. No.: 15/796,018

(22) Filed: Oct. 27, 2017

Related U.S. Application Data

(63) Continuation of application No. 14/699,320, filed on Apr. 29, 2015, now Pat. No. 9,863,191.

(60) Provisional application No. 61/987,531, filed on May 2, 2014.

(51) Int. Cl.
  *E21B 17/03* (2006.01)
  *E21B 4/00* (2006.01)
  *E21B 3/00* (2006.01)

(52) U.S. Cl.
  CPC .............. *E21B 17/03* (2013.01); *E21B 3/00* (2013.01); *E21B 4/003* (2013.01)

(58) Field of Classification Search
  CPC ............. E21B 17/03; E21B 3/00; E21B 4/003
  USPC ........................................................ 175/195
  See application file for complete search history.

(56) References Cited

U.S. PATENT DOCUMENTS

| | | | |
|---|---|---|---|
| 3,183,684 A * | 5/1965 | Zeidler | F16C 3/03 464/162 |
| 3,323,326 A | 6/1967 | Vertson | |
| 4,496,251 A | 1/1985 | Ide | |
| 4,515,486 A | 5/1985 | Ide | |
| 4,526,482 A | 7/1985 | Ide | |
| 4,676,668 A | 6/1987 | Ide | |
| 4,738,453 A | 4/1988 | Ide | |
| 4,810,170 A | 3/1989 | Ide | |
| 4,877,257 A | 10/1989 | Ide | |
| 5,007,490 A | 4/1991 | Ide | |
| 5,007,491 A | 4/1991 | Ide | |
| 5,013,947 A | 5/1991 | Ide | |
| 5,033,871 A | 7/1991 | Ide | |
| 5,048,622 A | 9/1991 | Ide | |
| 5,048,981 A | 9/1991 | Ide | |
| 5,054,938 A | 10/1991 | Ide | |
| 5,066,144 A | 11/1991 | Ide | |
| 5,096,004 A | 3/1992 | Ide | |
| 5,102,236 A | 4/1992 | Ide | |
| 5,102,237 A | 4/1992 | Ide | |
| 5,112,143 A | 5/1992 | Ide | |
| 5,125,754 A | 6/1992 | Ide | |
| 5,135,060 A | 8/1992 | Ide | |
| 5,136,739 A | 8/1992 | Ide | |
| 5,137,373 A | 8/1992 | Ide | |
| 5,139,400 A | 8/1992 | Ide | |
| 5,142,174 A | 8/1992 | Ide | |

(Continued)

*Primary Examiner* — Taras P Bemko
(74) *Attorney, Agent, or Firm* — Plumsea Law Group, LLC

(57) ABSTRACT

A progressive cavity device including an articulated coupling for converting the complex motion of a rotor into simple rotation. The coupling may include two shafts coupled to one another by joint assemblies connected to opposite ends of an intermediate shaft. The joint assemblies may include interleaved male and female spline portions and an elastomer filling the spaces between the male and female splines. The elastomer may deflect under load to allow the male and female splines to move relative to each other to allow the assembly to react to shaft misalignments. To limit elastomer bulging from the ends of the joint in response to shaft movement, the bulge area may be capped so that the elastomer cannot bulge outward and become extremely stiff.

20 Claims, 11 Drawing Sheets

(56) References Cited

U.S. PATENT DOCUMENTS

| | | |
|---|---|---|
| 5,149,223 A | 9/1992 | Watts |
| 5,156,443 A | 10/1992 | Ide |
| 5,165,140 A | 11/1992 | Ide |
| 5,203,438 A | 4/1993 | Ide |
| 5,203,808 A | 4/1993 | Ide |
| 5,213,421 A | 5/1993 | Ide |
| 5,213,545 A | 5/1993 | Ide |
| 5,215,385 A | 6/1993 | Ide |
| 5,222,815 A | 6/1993 | Ide |
| 5,246,295 A | 9/1993 | Ide |
| 5,254,893 A | 10/1993 | Ide |
| 5,255,984 A | 10/1993 | Ide |
| 5,275,493 A | 1/1994 | Ide |
| 5,281,033 A | 1/1994 | Ide |
| 5,284,392 A | 2/1994 | Ide |
| 5,304,006 A | 4/1994 | Ide |
| 5,321,328 A | 6/1994 | Ide |
| 5,372,431 A | 12/1994 | Ide |
| 5,377,802 A | 1/1995 | Ide |
| 5,382,097 A | 1/1995 | Ide |
| 5,385,409 A | 1/1995 | Ide |
| 5,393,145 A | 2/1995 | Ide |
| 5,403,154 A | 4/1995 | Ide |
| 5,417,612 A | 5/1995 | Ide |
| 5,421,655 A | 6/1995 | Ide et al. |
| 5,425,584 A | 6/1995 | Ide |
| 5,436,515 A | 7/1995 | Ide |
| 5,441,347 A | 8/1995 | Ide |
| 5,447,472 A | 9/1995 | Ide |
| 5,455,778 A | 10/1995 | Ide et al. |
| 5,459,674 A | 10/1995 | Ide et al. |
| 5,489,155 A | 2/1996 | Ide |
| 5,499,705 A | 3/1996 | Ide |
| 5,503,479 A | 4/1996 | Ide |
| 5,513,917 A | 5/1996 | Ide et al. |
| 5,515,458 A | 5/1996 | Ide |
| 5,531,522 A | 7/1996 | Ide et al. |
| 5,556,208 A | 9/1996 | Ide |
| 5,558,444 A | 9/1996 | Ide |
| 5,559,383 A | 9/1996 | Ide |
| 5,564,836 A | 10/1996 | Ide et al. |
| 5,603,574 A | 2/1997 | Ide et al. |
| 5,620,260 A | 4/1997 | Ide |
| 5,660,481 A | 8/1997 | Ide |
| 5,743,654 A | 4/1998 | Ide et al. |
| 5,833,541 A | 11/1998 | Turner et al. |
| 5,931,000 A | 8/1999 | Turner et al. |
| 6,102,681 A | 8/2000 | Turner |
| 6,105,690 A | 8/2000 | Biglin, Jr. et al. |
| 6,123,561 A | 9/2000 | Turner et al. |
| 6,134,892 A | 10/2000 | Turner et al. |
| 6,257,356 B1 | 7/2001 | Wassell |
| 6,507,401 B1 | 1/2003 | Turner et al. |
| 6,547,016 B2 | 4/2003 | Wassell |
| 6,634,427 B1 | 10/2003 | Turner et al. |
| 6,707,556 B2 | 3/2004 | Turner et al. |
| 6,714,138 B1 | 3/2004 | Turner et al. |
| 6,808,455 B1 | 10/2004 | Solorenko et al. |
| 6,916,248 B1 | 7/2005 | Burgess |
| 7,163,368 B2 | 1/2007 | Ide et al. |
| 7,201,239 B1 | 4/2007 | Perry |
| 7,219,752 B2 | 5/2007 | Wassell et al. |
| 7,249,968 B1 | 7/2007 | Fish et al. |
| 7,306,059 B2 | 12/2007 | Ide |
| 7,327,634 B2 | 2/2008 | Perry et al. |
| 7,377,339 B2 | 5/2008 | Wassell et al. |
| 7,389,830 B2 | 6/2008 | Turner et al. |
| 7,508,956 B2 | 3/2009 | Scheppmann |
| 7,665,954 B2 | 2/2010 | Ide et al. |
| 7,681,663 B2 | 3/2010 | Cobern |
| 7,712,550 B2 | 5/2010 | Ide |
| 7,762,356 B2 | 7/2010 | Turner et al. |
| 7,922,085 B2 | 4/2011 | Thomas et al. |
| 7,997,357 B2 | 8/2011 | Wassell et al. |
| 8,016,052 B2 | 9/2011 | Ide |
| 8,087,476 B2 | 1/2012 | Wassell et al. |
| 8,118,117 B2 | 2/2012 | Ide et al. |
| 8,181,868 B2 | 5/2012 | Thomas et al. |
| 8,240,401 B2 | 8/2012 | Wassell et al. |
| 8,397,562 B2 | 3/2013 | Wassell et al. |
| 8,453,764 B2 | 6/2013 | Turner et al. |
| 8,525,690 B2 | 9/2013 | Puro et al. |
| 8,640,791 B2 | 2/2014 | Turner et al. |
| 8,662,205 B2 | 3/2014 | Wassell et al. |
| 8,666,908 B2 | 3/2014 | Hall et al. |
| 8,684,108 B2 | 4/2014 | Turner et al. |
| 8,944,190 B2 | 2/2015 | Wassell et al. |
| 9,057,245 B2 | 6/2015 | Wassell |
| 2002/0011358 A1 | 1/2002 | Wassell |
| 2002/0084029 A1 | 7/2002 | Turner et al. |
| 2004/0241021 A1 | 12/2004 | Ide et al. |
| 2005/0027435 A1 | 2/2005 | Scheppmann |
| 2006/0243487 A1 | 11/2006 | Turner et al. |
| 2006/0278439 A1 | 12/2006 | Ide |
| 2006/0283632 A1 | 12/2006 | Hall et al. |
| 2007/0110561 A1 | 5/2007 | Ide et al. |
| 2007/0284148 A1 | 12/2007 | Wassell et al. |
| 2008/0115976 A1 | 5/2008 | Ide |
| 2008/0252417 A1 | 10/2008 | Thomas et al. |
| 2008/0315471 A1 | 12/2008 | Wassell et al. |
| 2009/0008151 A1 | 1/2009 | Turner et al. |
| 2009/0268995 A1 | 10/2009 | Ide et al. |
| 2010/0008188 A1 | 1/2010 | Hall et al. |
| 2010/0187014 A1 | 7/2010 | Ide |
| 2010/0214121 A1 | 8/2010 | Puro et al. |
| 2010/0224410 A1 | 9/2010 | Wassell et al. |
| 2011/0017693 A1 | 1/2011 | Thomas et al. |
| 2011/0024188 A1 | 2/2011 | Wassell et al. |
| 2011/0186353 A1 | 8/2011 | Turner et al. |
| 2011/0291334 A1 | 12/2011 | Wassell et al. |
| 2012/0085581 A1 | 4/2012 | Wassell et al. |
| 2012/0103689 A1 | 5/2012 | Hutchinson |
| 2012/0111559 A1 | 5/2012 | Deady et al. |
| 2012/0228028 A1 | 9/2012 | Turner et al. |
| 2013/0056283 A1 | 3/2013 | Wassell et al. |
| 2013/0250728 A1 | 9/2013 | Burgess |
| 2014/0102793 A1 | 4/2014 | Hall et al. |
| 2014/0224537 A1 | 8/2014 | Wassell et al. |
| 2014/0251688 A1 | 9/2014 | Turner et al. |
| 2015/0145687 A1 | 5/2015 | Roberts |

\* cited by examiner

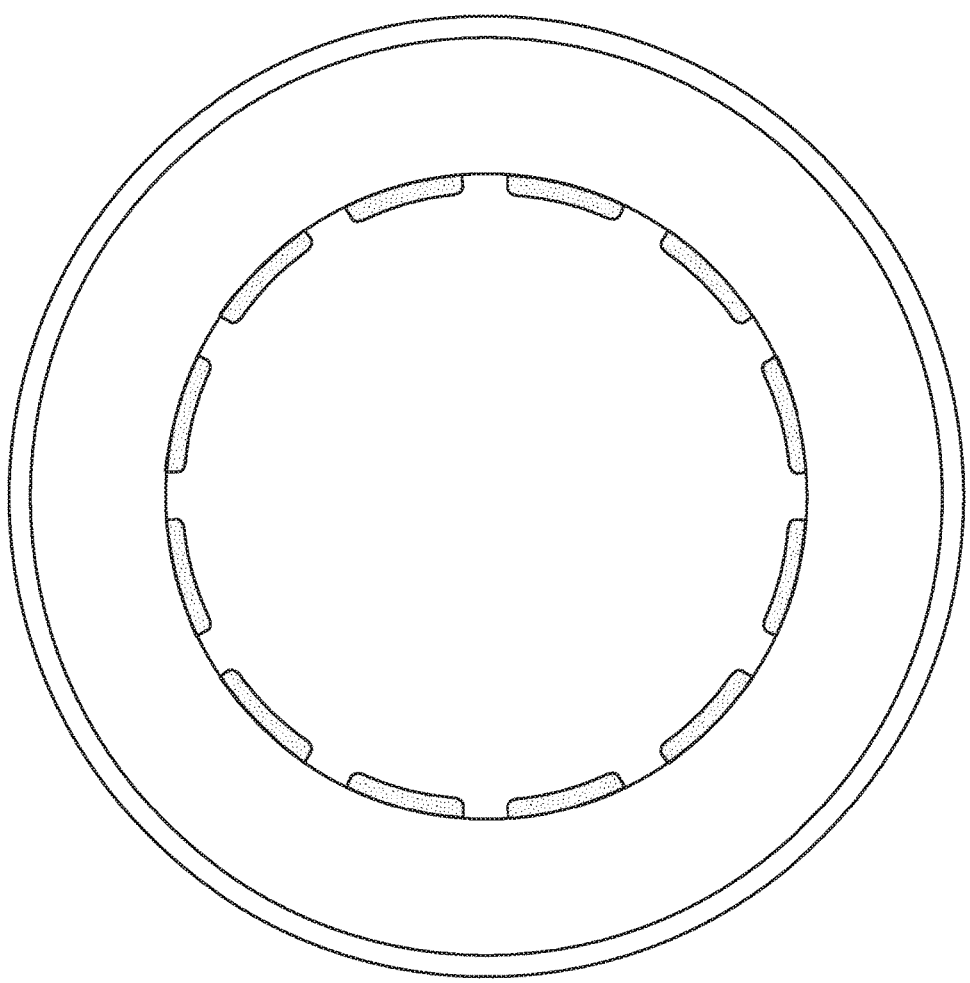

FLEXIBLE COUPLING

This application is a continuation of U.S. application Ser. No. 14/699,320, filed Apr. 29, 2015, which claims the benefit of U.S. Provisional Patent Application No. 61/987,531, filed May 2, 2014, which is herein incorporated by reference in its entirety.

FIELD

The present embodiments relate to flexible couplings that include a male splined member fitted within a female splined member, and a layer of elastically deformable material positioned between adjacent portions of the male and female splined members. The flexible couplings are suitable for transmitting torque, as well as for attenuating vibrations and applied stresses. The flexible couplings are particularly suited for use in the downhole drilling industry, such as for interconnecting a plurality of drill pipe sections, and for isolating electronic components within a drill pipe section to reduce the potential damaging transmission of shock pulses from an end-connected drill bit.

BACKGROUND

Flexible couplings are useful in various applications where there is a need to connect a drive source, such as a motor, to a peripheral device, in which the components might be subject to initial misalignment or dynamically misaligned in use due to the nature of the components.

Flexible couplings are also used to reduce the transmission of stress and vibration between two or more connected components. For example, in oil well drilling and pumping there are severe shocks and vibrations that are detrimental to the drilling and pumping equipment. Drilling assemblies used in the oil and gas industry to retrieve resources buried within earth formations typically include a drilling string connected to a drill bit. The drilling string includes interconnected pipe segments with the drill bit positioned at a distal end thereof. As the drill bit cuts through the earth, vibrations, usually at high frequencies, occur and are transmitted along the drilling string. These high frequency vibrations may cause fatigue, deterioration, and finally failure of the components of the drilling assembly. In addition, drill string sections may comprise highly sensitive electronic devices. The electronics must be isolated from the same high frequency vibrations, as well as other applied stresses. Furthermore, the electronic devices must be isolated from torsional loads that occur during acceleration or deceleration of the section carrying the electronics.

In progressive cavity devices, oil well drilling fluid is pumped through a progressive cavity motor that drives the bit. In oil production, particularly for heavy crude, an electric submersible motor drives the progressive cavity pump to pump oil out of the ground. The progressive cavity device can be used as a motor or pump depending on whether it is driven by fluid (motor) or by being turned by an electric motor (pump). U.S. Pat. No. 3,323,326 (Vertson) discloses a metal elastomer helix coupled to a metal elastomer spline that is connected to the drill string to dampen vibrations. The helix consists of a metal male/female thread separated by an elastomer. The spline section consists of a metal female spline separated by an elastomer. U.S. Pat. No. 5,447,472 (Ide) shows two metal/elastomer helixes connected by a shaft that acts like a universal type coupling to compensate for misalignments between the drive motor and drive shaft. U.S. Pat. No. 5,833,541 (Turner/Ide) shows one end of the helix shown in U.S. Pat. No. 5,447,472 to dampen vibrations for instrumentation and a one directional tapered metal/elastomer helix. U.S. Pat. No. 6,808,455 (Sobrenko/Miller) shows a metal/elastomer spline for torsional shock absorption. The elastomer is unbonded and tapered longitudinally to provide a non-linear stiffness. U.S. Pat. No. 6,916,248 (Burgess) shows the single helix of U.S. Pat. No. 5,833,541 but with a double tapered thread to prevent separation.

As drilling motors become more powerful, there is a need to provide a higher torque coupling.

SUMMARY

The present embodiments may provide a flexible coupling that is useful in joint assemblies and other applications. The flexible coupling may comprise interleaved female and male splined members separated from one another by a layer of elastomer. In an embodiment, the female member may have an internal surface with radially spaced female splines formed thereon. The male member may have an external surface with radially spaced male splines formed thereon. At least a portion of the male member may be disposed within the female member such that male splines are disposed entirely within the female portion. The female splines and the male splines may be interleaved but generally spaced apart from each other and a layer of elastically deformable material may be disposed in the space between the female and male splines.

In accordance with an important aspect of the present embodiments, the spline and elastomer shapes and configuration may be designed to provide restricted volumes of elastomer that prevent the elastomer from deflecting/flowing. As the elastomer becomes constrained, it may begin to act like an incompressible fluid that is capable of extremely high pressures/loadings, for the transmittal of very large torques in comparison to conventional designs.

One feature that may enhance torque capacity is an end cap that limits the flow of elastomer from the flexible coupling. The end cap may be secured to the female member and may extend radially inward toward the unsplined portion of the male member that extends out of the female member. Alternatively, the end cap may be secured to the male member and may extend radially toward the female member. The cap may minimize the externally exposed elastomer area thus limiting the space available for the elastomer to flow under pressure. Limiting the space available for the elastomer to flow under pressure has been found to create an almost constant volume, to build high internal pressures and increase torque transmission capacity.

By limiting the area where the elastomer can bulge outward, the elastomer may be constrained such that the elastomer begins to act like an incompressible fluid capable of very large pressures to react/transmit high torques. In particular, elastomers are polymers that can be distorted and return to their original shape. In compression, the stiffness is controlled by a dimensionless ratio called the shape factor. The shape factor is defined as the ratio of the loaded area to the bulge area. For high shape factors, i.e., relatively small bulge area compared to the pressure area, the elastomer cannot bulge or deflect outward and may act like an incompressible fluid capable of very high loads.

Another feature that may enhance torque capacity is a unique female spline configuration that defines partially circular channels having a major arc section. The basic metal spline sections may be machined (e.g., drilled) with partially circular channels having a major arc from longitudinally extending pockets that trap the elastomer as the male spline deflects towards it. The high pressure pockets formed by the female splines may allow the coupling to transmit very large torques and many times the elastomers design yield strength.

In addition, the male member and female member are preferably made of metal and the elastomer is bonded to the metal components. This may hold the elastomer in place adjacent to the metal surfaces, which limits elastomer flow and locks the elastomer in place. When used in a combination of two metal elastomer splines separated by a connecting shaft, the present embodiments may act like a universal joint to transmit high torque and compensate for shaft misalignments.

In addition, the splines may be tapered towards the ends to allow greater relative movement between the two splines to compensate for larger misalignments. In one embodiment, the male splines are tapered in two opposing directions with respect to a coupling centerline.

The elastomer element deflecting under load may allow the male and female splines to move relative to each other to allow the assembly to react to shaft misalignments. In order for the shafts to move, the elastomer may bulge out from the ends. Failure may result when the bulge becomes great enough to fail the elastomer. When the bulge area is capped, the elastomer cannot bulge outward and becomes extremely stiff. The elastomer may, however, flow from one region internally to the other, allowing movement of the splines with very high torque capacity. Testing suggests that use of the end cap to limit bulging may result in a doubling of torque capacity. Some of the improved torque capacity may also be attributable to the pressure pocket effect resulting from the unique female spline configuration. A joint of the present embodiments may therefore allow movement of the splines with very high torque capacity.

BRIEF DESCRIPTION OF THE DRAWINGS

Other objects, features, and advantages of the present embodiments are hereinafter set forth and explained with reference to the drawings wherein:

FIG. 6A is an end view of an assembly of the type shown in FIG. 6, showing an end cap secured to the female splined portion;

DETAILED DESCRIPTION

Flexible couplings of the present embodiments are useful in joint assemblies and other applications. The couplings disclosed hereinafter are generally applicable to applications in which only limited flexibility is required, but performance demands (e.g., torque capacity, shock absorption, and vibration damping) and operating conditions are extremely demanding. The most obvious example is downhole drilling and pumping using progressive cavity devices. With that understanding, embodiments will be described in the context of downhole drilling. The present embodiments are also particularly well suited for use in a downhole progressive cavity pump or applications with similar demands. The use of progressive cavity pumps is well known and the application of the coupling of the present embodiments to a progressive cavity pump should be readily understood in view of the following description. Those skilled in the art will recognize that the flexible couplings described herein are useful in other applications in which limited flexibility is sufficient, but performance requirements (e.g., torque capacity, shock absorption, and vibration damping) and operating conditions are extremely demanding.

Figure 1:
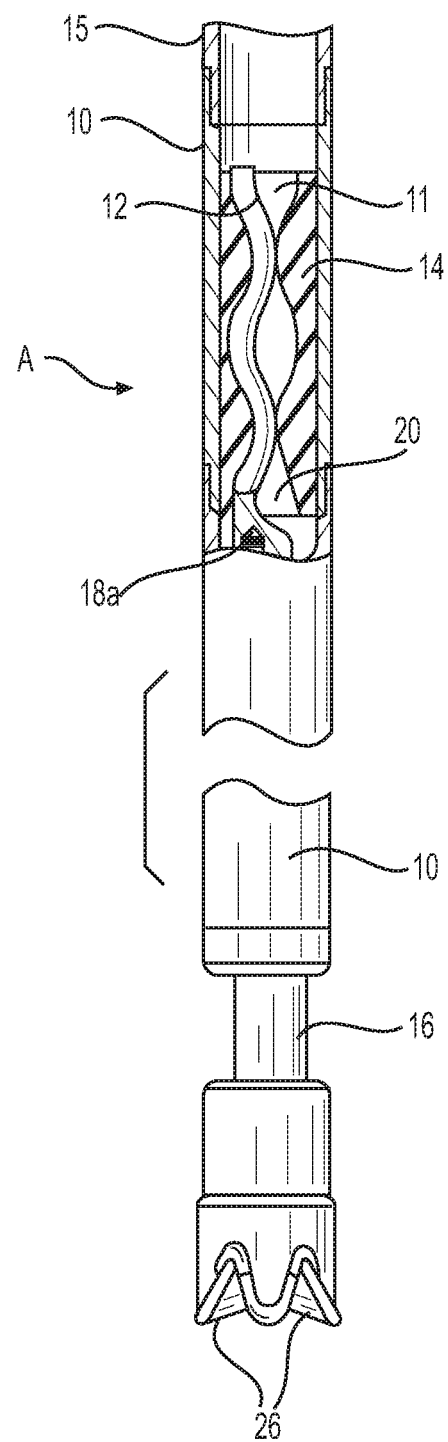
FIG. 1 is an elevation view, partly in section, of the overall structure of a downhole drilling apparatus of the type in which the coupling of the present embodiments may be used.

FIG. 1 shows well-known components of a progressive cavity drilling apparatus using a progressive cavity drive train. The apparatus may include a drill string 15, a progressive cavity drive train, a drill bit drive shaft 16, and a drill bit 26. The drive train of the present embodiments may comprise a progressive cavity device and a sealed coupling for converting the motion of the rotor of the progressive cavity device, i.e., orbiting of the rotor and the rotational motion of the rotor, into rotation about a single axis at the same speed.

As illustrated in FIG. 1, the progressive cavity device A may have a stator, a rotor, an inlet passageway 11 for fluid to enter between the stator and the rotor, and an outlet passageway 20 for the fluid to exit therefrom. The housing 10 and its flexible lining 14 may be held against movement so that they function as the stator in the device A and the shaft 12 functions as the rotor. The housing 10 may be tubular and its interior may communicate with inlet 11 in the top portion of the lining 14 to provide a passageway for fluid to enter the progressive cavity device A. Outlet 20 in the bottom portion of the lining 14 may serve as the passageway for fluid to discharge from the progressive cavity device A. The shaft 12 may be precisely controlled so as to roll within the lining 14. The progressive cavity device A may be attached to the lower end of a drill string 15.

The lower end of the rotor shaft 12 may include a shaft connection 18a. The shaft connection 18a may allow the rotor 12 to be directed to a stub shaft of the coupling (described below). The coupling may be located in the lower part of the housing 10 and is not visible in FIG. 1.

The progressive cavity device of the present embodiments may function as a fluid motor or driving apparatus for driving the drilling apparatus shown in FIG. 1. If so, a pressurized fluid, typically water carrying suspended particles commonly referred to as "mud," is forced into the progressive cavity device. The rotor 12 may respond to the flowing fluid to produce a rotor driving motion, which is simultaneously a rotation, an oscillation, and an orbit. The coupling, described below, attached to the rotor 12 at connection point 18*a* and aligned with the true center of the rotor described above, may convert this rotor driving motion into rotational driving motion substantially about a single axis.

The progressive cavity device of the present embodiments may also function as a pump. If so, a rotatable driving shaft may be coupled to the rotor by the articulated coupling described below. The driving shaft may cause the rotor to roll within the cavity, which provides a pumping action as is well known to those skilled in the art.

Figure 2:
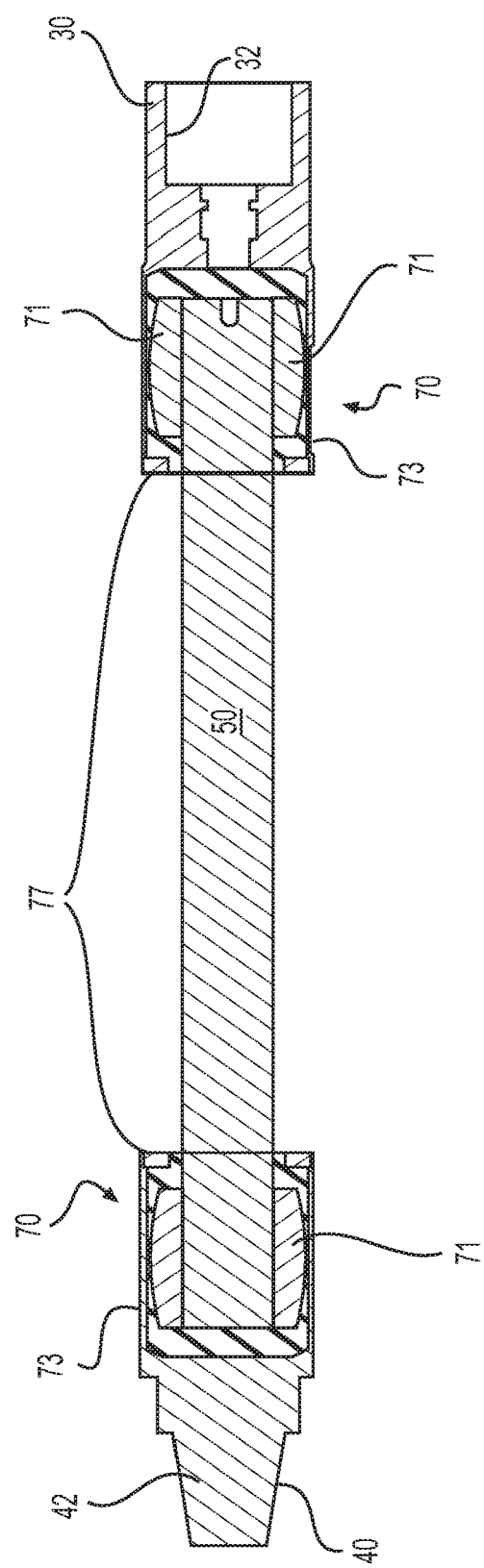
FIG. 2 is a sectional view of a coupling assembly with the section taken through the male spline, according to an embodiment.
Figure 2A:
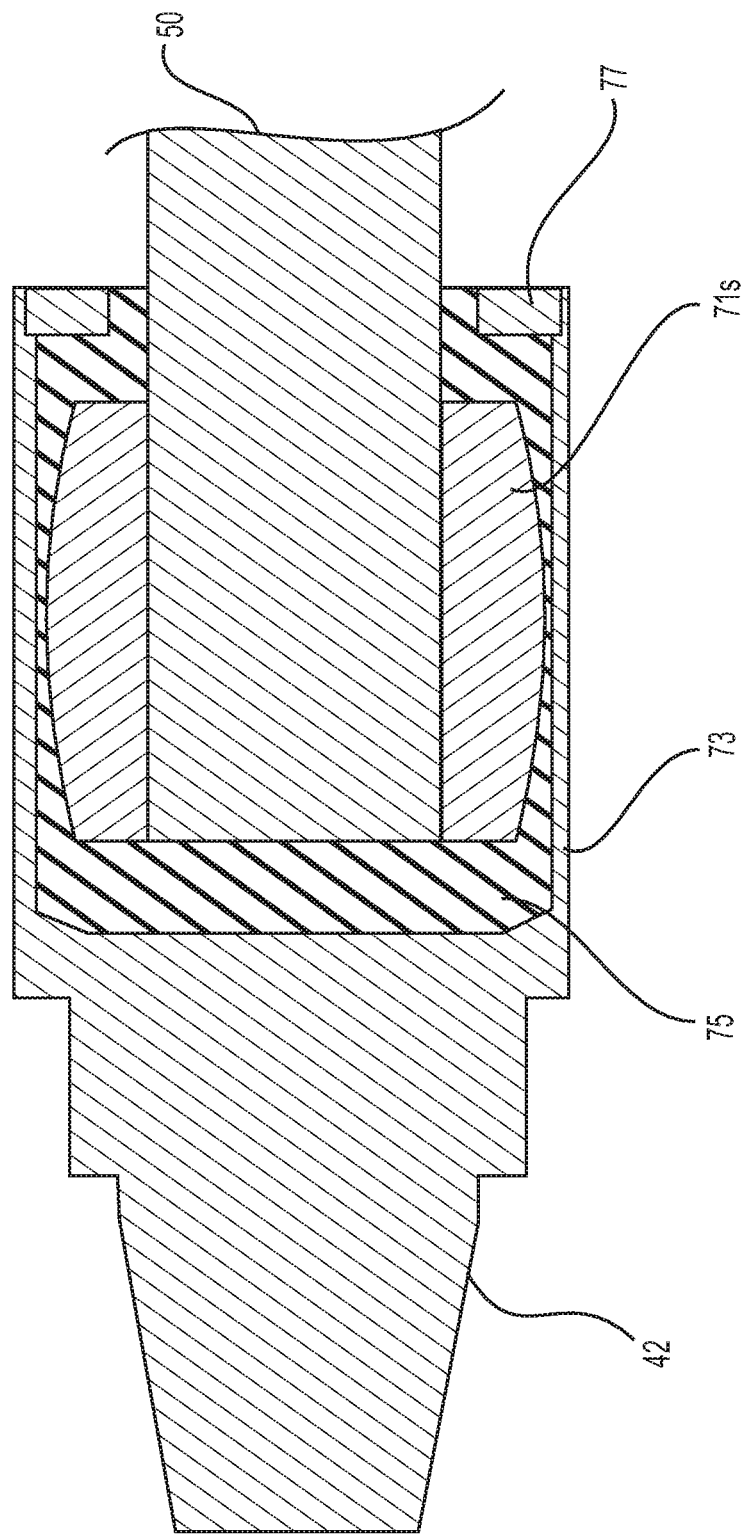
FIG. 2A is an enlarged detail view of the API threaded end of the coupling assembly of FIG. 2.

FIG. 2 shows a sectional view (through a male spline) of an assembly using a flexible coupling, according to an embodiment. Specifically, the assembly may include a first stub shaft 30, a second stub shaft 40, an intermediate shaft 50, and two elastomeric splined joint (coupling) assemblies 70.

The elastomeric splined joint assemblies 70, described in detail below, may connect the first stub shaft 30 to the intermediate shaft 50 at one end thereof and connect the second stub shaft 40 to the intermediate shaft 50 at the other end of the intermediate shaft 50.

The stub shafts 30, 40 may each include a connection portion that allows the stub shafts to be connected to either the rotor 12 or the drill bit drive shaft 16 in the manner described above. A variety of connecting means, including threads on the ends of the stub shaft, splines, or the like, may be employed. Additionally, as mentioned above, the stub shafts could be formed integrally with either the rotor shaft 12 or the drill bit drive shaft 16.

As shown, an embodiment of the stub shaft 30 may be provided with an internal Stub Acme thread 32. A Stub Acme thread may be useful in applications in which a coarse pitch thread of shallow depth must be used due to mechanical or metallurgical considerations. The stub shaft 40 may include an external API thread 42 for assembly into the drill string. The API thread 42 may conform to standards set by the American Petroleum Institute (API) to ensure that the threads on the end of a section of pipe match up with any other section of pipe, regardless of the manufacturer.

The end of the stub shafts opposite the end having the connecting portion may be integral with or secured to the female portion 73 of the joint assembly 70.

The intermediate shaft 50 may be secured to the male portion 71 of joint assembly 70 by a splined connection, but other connections or even integral formation may be possible. Though the intermediate shaft could be made integral with the portion of the joint assembly to which it is fixed, this might complicate manufacture.

As detailed below, the couplings may each include a splined male portion 71 (e.g., tapered as shown) and a splined female portion 73, which may be interleaved and joined together by highly restrained rubber or some other elastomer bonded to both the male portion 71 and the female portion 73. Since the elastomer is compressible, the male and female portions may pivot to a limited degree with respect to an adjacent portion in any direction.

As noted above, the portions located at either end of the joint assembly may be secured to a shaft (either a stub-shaft or the intermediate shaft) and the overall coupling assembly may include a stub shaft, a joint assembly, an intermediate shaft, another joint assembly, and a second stub shaft. This overall assembly may have flexibility somewhat similar to that of a conventional double Hooke's joint, except that the direction of pivoting of the coupling portions with respect to one another may not be as limited as with a double Hooke's joint. Although this gives the coupling of the present embodiments somewhat greater flexibility, it could present a problem. Because the axes of pivoting of the coupling portions with respect to one another may not be precisely controlled, the ability to eliminate cyclic variations in output speed may be lost. One of the advantages of the double Hooke's joint is that the pivoted axes are arranged such that cyclic velocity variations at each universal joint are cancelled, thereby giving a constant output speed. This result may not necessarily be obtained using a rubber coupling such as that disclosed herein, wherein the pivoting within the coupling can be about any axis.

Although couplings of the present embodiments may not be, strictly speaking, a double Hooke's joint, it is nevertheless expected that the output of the couplings may have a substantially constant velocity for at least two reasons. First, the angle of deviation of the shaft portions used in the present embodiments may be typically less than 5 degrees angle of deviation and may approach 0 degrees minimal or even insignificant. Further, because the two joint assemblies used may be identical, but spaced, they will tend to operate out of phase such that any minimal velocity variations will be cancelled out. If it is critical to avoid any velocity variation whatsoever, the joint assemblies could be forced to operate out of phase for this purpose. However, this is not believed necessary for downhole drilling or pumping because absolute constant velocity is not required.

The construction of embodiments of the elastomeric joint assembly 70 will now be described in greater detail with reference to FIGS. 2A-7A and the test results shown in FIG. 8. In those figures, an elastomer 75 may fill the spaces in between, and may be bonded to, the respective splined portions 71 and 73 of the joint assembly. In embodiments, the elastomer may fill all of the voids between the respective splined portions 71, 73 and other components, such that there are no sliding surfaces within the joint assembly and the relatively moving portions are perfectly isolated so that the joint assembly itself is perfectly isolated from the surrounding environment. The elastomer components of the present embodiments may be made of any known suitable elastomer, such as nitrile, depending on compatibility with the environment and operating conditions, for example, temperature, chemical compatibility, and strength.

While the male splines 71 and female splines 73 are separated by an elastomer 75, the spline/elastomer shapes may be designed to provide restricted volumes of elastomer that restrict the elastomer from deflecting/flowing in certain directions, while providing enhanced elastomer thickness in other directions. As the elastomer becomes constrained, it may begin to act like an incompressible fluid that is capable of extremely high pressures/loadings, for the transmittal of very large torques. This may be accomplished by two means: first, through the shape of the splines; and second, by providing elastomer bulge restricting end caps. The basic metal female splines may be machined (e.g., drilled) with semicircular channels (see, e.g., FIGS. 3 and 5) that trap the elastomer as the male spline deflects towards it. The female splines may define partially circular channels having a major arc section, i.e., an arc section that is greater than 180 degrees. These high pressure pockets may transmit very large torques, many times the elastomer's design yield strength. The male splines 71 may be tapered in two opposing directions with respect to a coupling centerline, so that the elastomer is thicker at opposed ends of the male splined portion (see, e.g., FIGS. 2A and 4).

Figure 6:
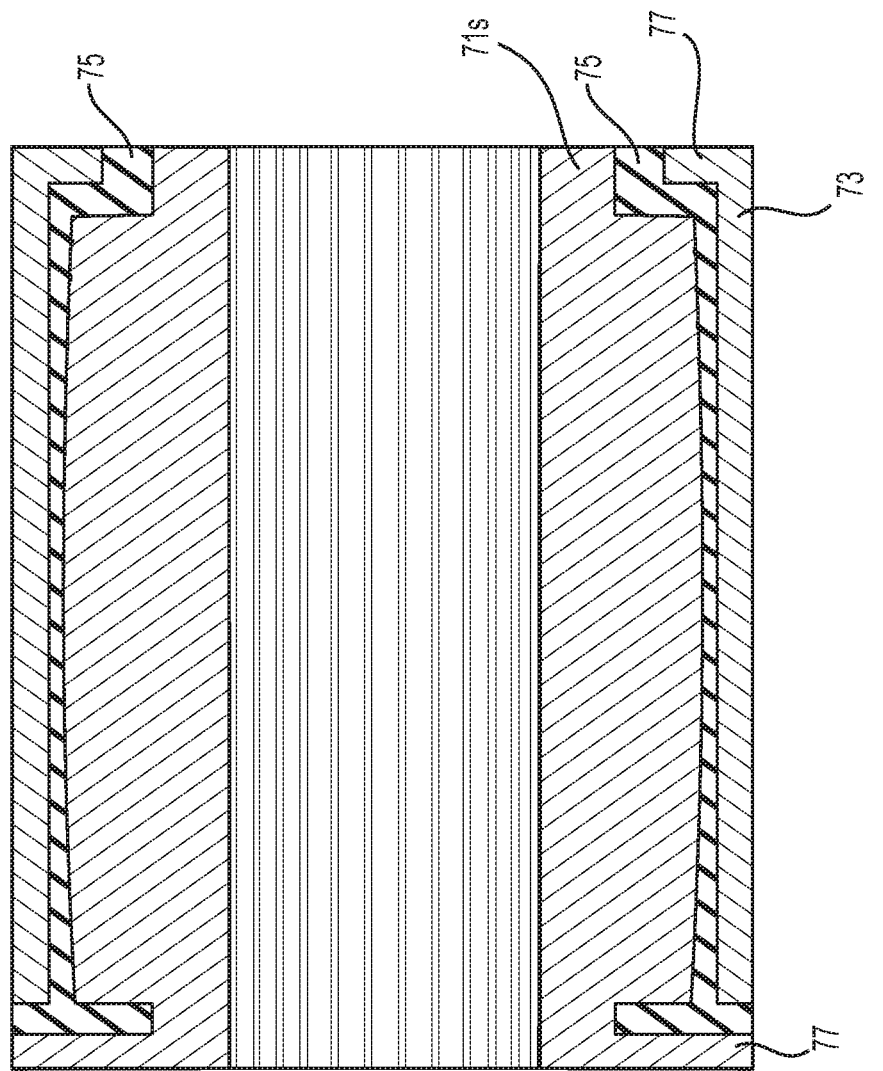
FIG. 6 is a partial sectional view through the coupling of FIG. 5, showing end caps formed integrally with the male spline portion and female spline portion.

To restrict elastomer flow, embodiments may provide elastomer flow bulge restrictors in the form of end caps to cap/minimize the externally exposed elastomer areas (see, e.g., FIGS. 6 and 6A). The percentage of surface area restriction (in comparison to an unrestricted end (see, e.g., FIGS. 7 and 7A)) may determine the amount of restriction. An embodiment may have a restriction between about 1% and about 99%. Elastomer end flow restriction may limit the flow of elastomer, creating an almost constant volume to build high internal pressures. It is further noted that the elastomer 75 may be bonded to the metal components 71, 73. Bonding holds the elastomer in place adjacent to the metal surfaces, which may limit elastomer flow and lock the elastomer 75 in place. When used in a combination of two metal elastomer splines separated by a connecting shaft, present embodiments may act like a universal joint to transmit high torque and compensate for shaft misalignments. Also, tapering the splines 71 towards the ends may allow greater relative movement between the two splines to compensate for larger misalignments. The metal components of the present embodiments may be made of any known suitable metal, such as steel, depending on compatibility with the environment and operating conditions, for example, temperature, chemical compatibility, and strength.

In operation, the flexibility of the portions 71 and 73 of the elastomeric joint assemblies 70 may allow a Hooke's-joint-type motion between the shafts connected by the joint assembly. Of course, as noted above, there may be some additional flexibility owing to the fact that the respective portions 71 and 73 of the joint assembly can pivot with respect to one another in any direction. The provision of two such joint assemblies and the intermediate shaft 50 between the two stub shafts 30, 40 may make it possible for the coupling to resolve complex motion of the rotor 12 into simple rotation of the drill bit drive shafts 16.

Thus, it can be appreciated that the use of the elastomeric joint assemblies between the respective stub shafts and the intermediate shaft may allow a resolution of the complex rotor motion into simple rotation of the drill bit drive shaft in a hermetically sealed environment. This configuration may solve the problems associated with conventional devices that employ non-hermetically sealed universal assemblies.

Figure 3:
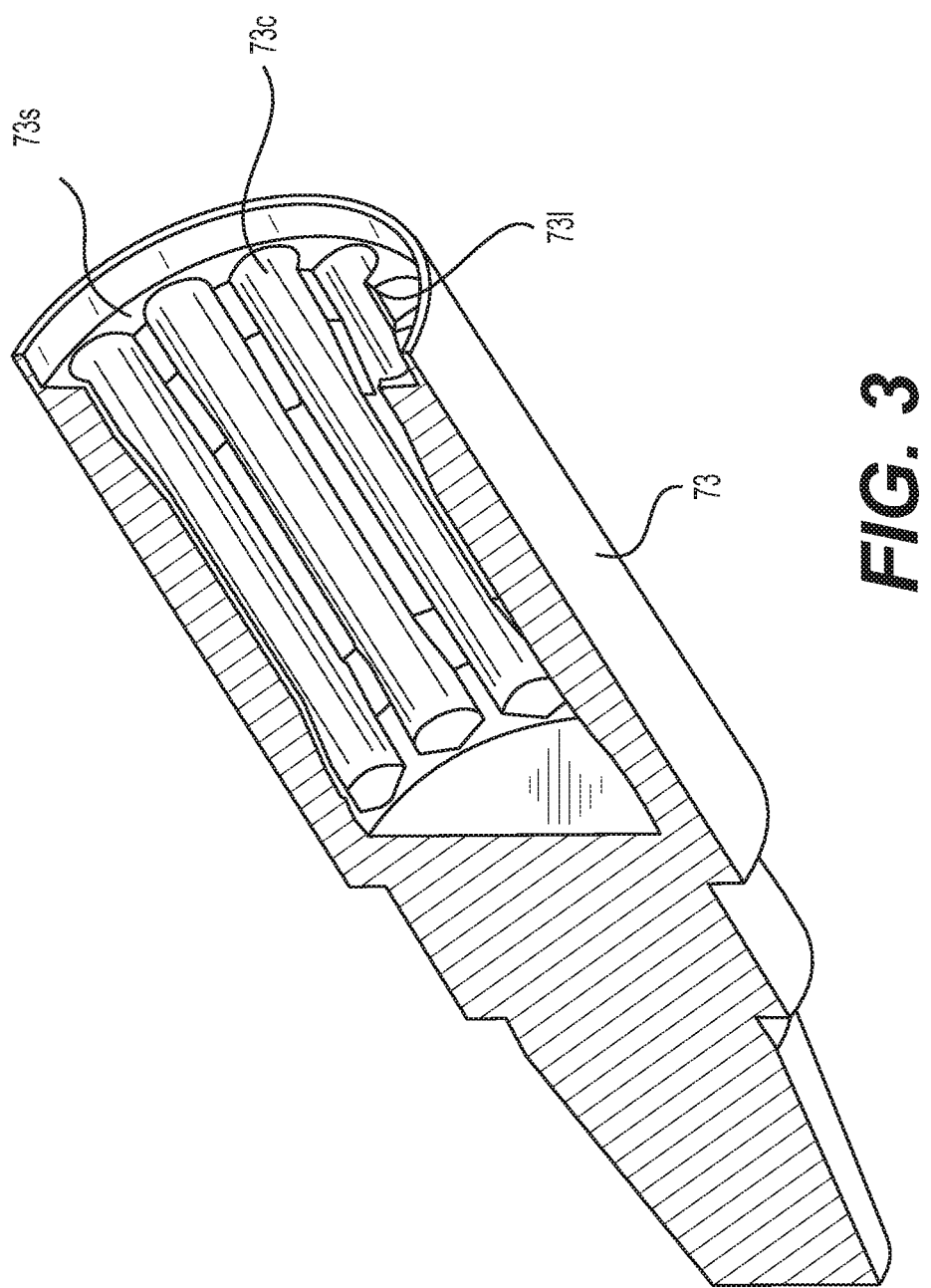
FIG. 3 is an isometric cross-sectional view of the female spline of the API threaded end of the coupling assembly of FIG. 2, with the threaded section for the end cap omitted for illustration purposes.

The isometric view of FIG. 3 shows the exemplary shape of female splines 73s of the API threaded end of the coupling, with the threaded section for the end cap omitted for illustration purposes. The spline shape may be defined by channels 73c that are partially circular and have a major arc (i.e., more than 180 degrees) axial section. With a major arc axial section, the channels 73c may define female splines 73s that have an expanded radially inward section or lip 731, which forms a pressure pocket when interleaved with male splines 71c in the assembly, as shown, for example, in FIG. 5. These high pressure pockets may transmit very large torques, many times the elastomers design yield strength.

Figure 4B:
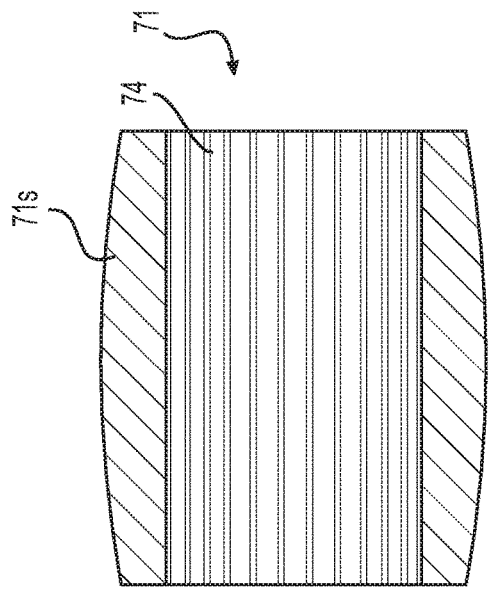
FIG. 4B is a longitudinal sectional view of the tapered male spline of FIG. 4 having an internal spline for attachment to a shaft and an external tapered male spline.
Figure 4A:
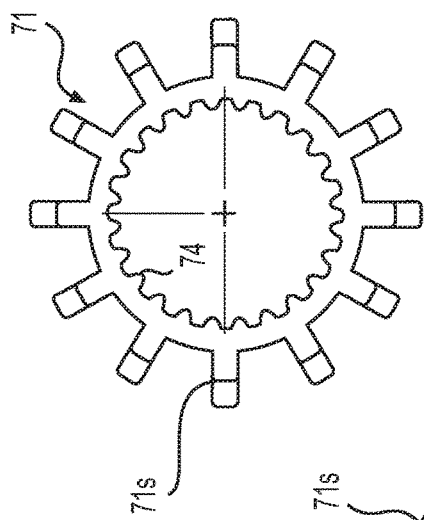
FIG. 4A is an end view of the tapered male spline of FIG. 4 having an internal spline for attachment to a shaft and an external tapered male spline.
Figure 4:
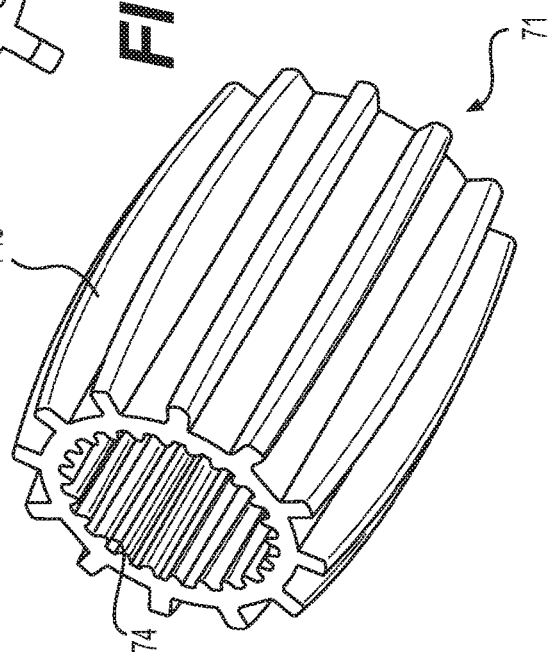
FIG. 4 is a perspective view of a tapered male spline having an internal spline for attachment to a shaft and an external tapered male spline, according to an embodiment.

FIGS. 4, 4A, and 4B show various views of the male splined portion 71, according to an embodiment. As shown in the perspective view of FIG. 4, tapered male splines 71s may be provided on the exterior surface and an internal spline 74 may be provided for attachment to a shaft and an external tapered male spline. Each male spline 71s may be tapered to allow additional shaft articulation. The end view of FIG. 4A shows tapered male spline 71s and the internal spline 74 for attachment to a shaft. The sectional view of FIG. 4B shows the tapered male spline 71s and the internal spline 74.

Figure 5:
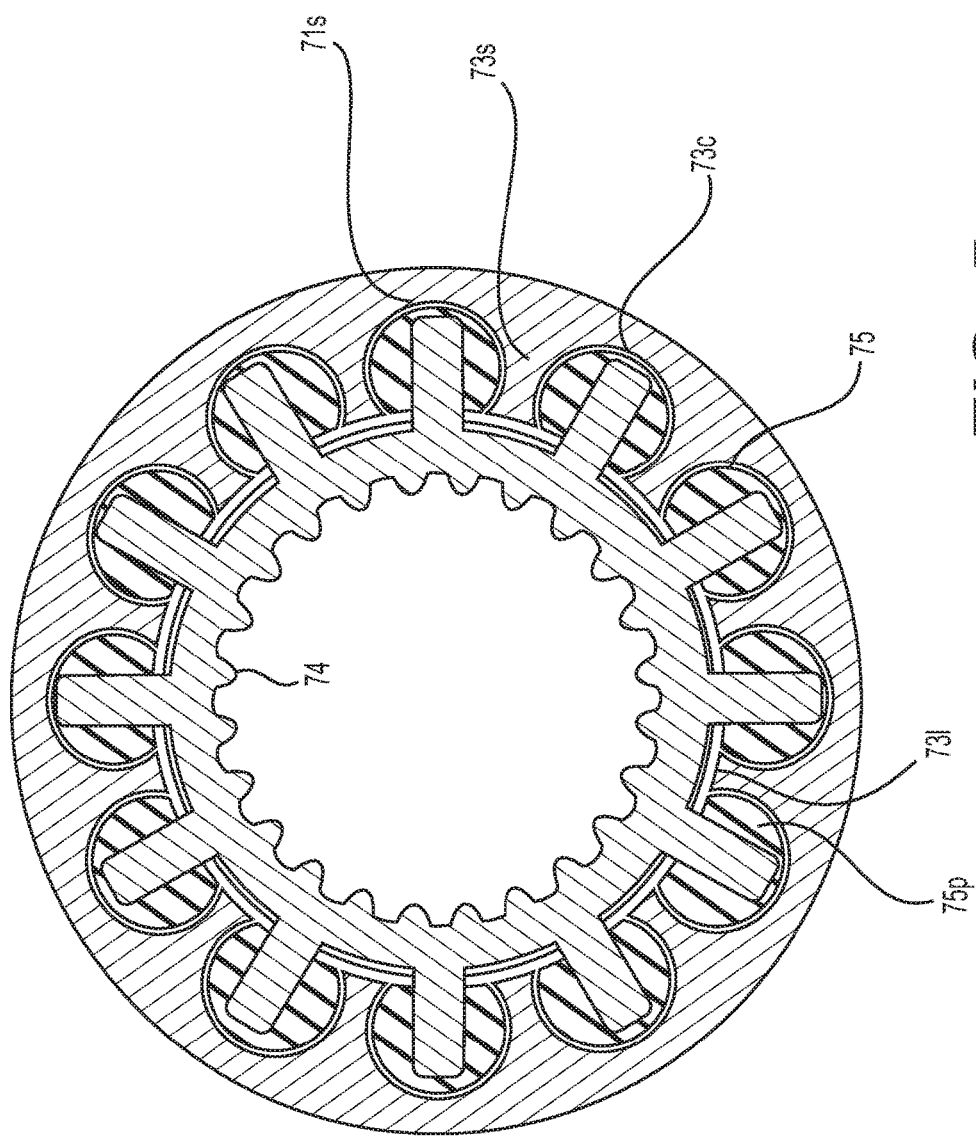
FIG. 5 is a sectional view of a coupling showing the female spline and male spline with elastomer between the splines, according to an embodiment.

FIG. 5 is a sectional end view of an embodiment of a coupling, showing an assembly in which the female splines 73s are interleaved with the male splines 71s and an elastomer 75 fills the gap between the splines 71s, 73s. As is evident from this end view, the shape of the female channels 73c, being a major arc, may partially encircle the male spline 71s such that a spline lip 731 traps elastomer 75 into a pressure pocket 75p. Under torsional stress, these high pressure pockets may compress the elastomer 75 and transmit very large torques, many times the elastomers design yield strength. Female channels 73c may be manufactured by drilling the channels, to achieve the shape shown in FIG. 5. Male spline 71s may include secondary internal female spline 74 for attachment to a shaft.

Figure 7:
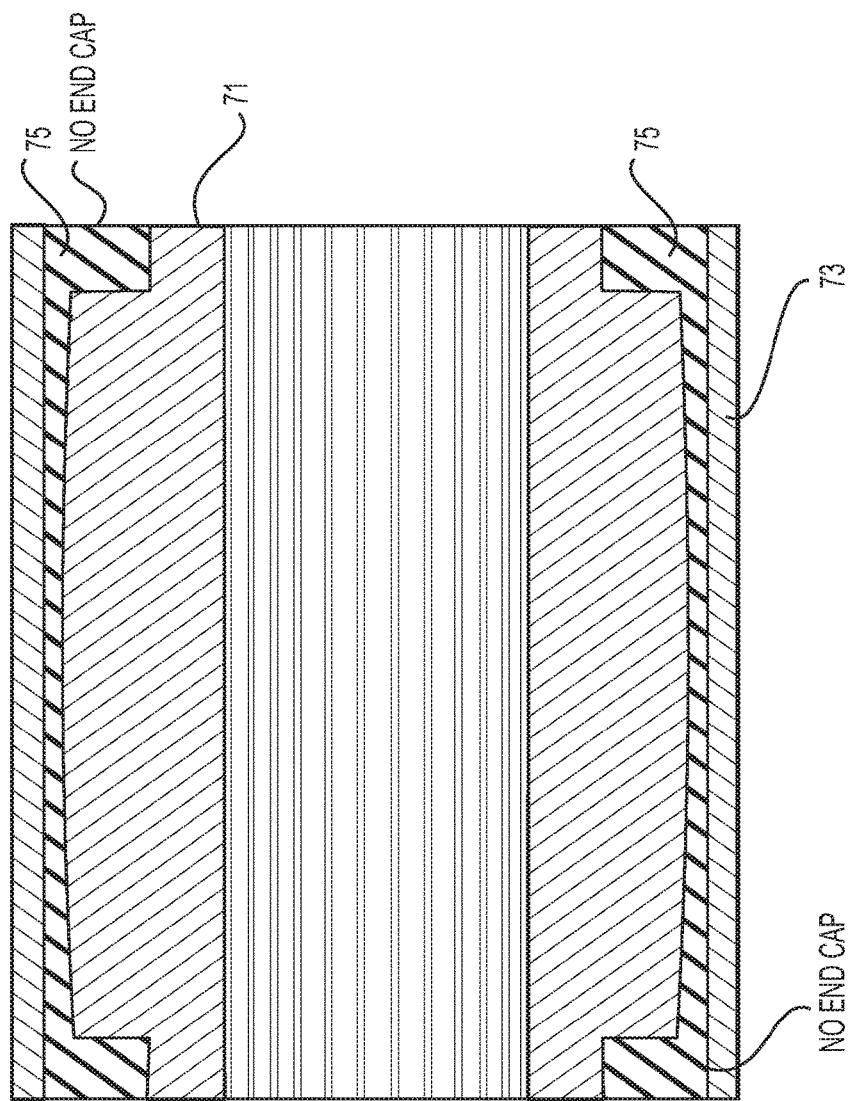
FIG. 7 is a partial sectional view through a coupling, showing the male spline and the female spline with no end caps, according to an alternative embodiment.
Figure 7A:
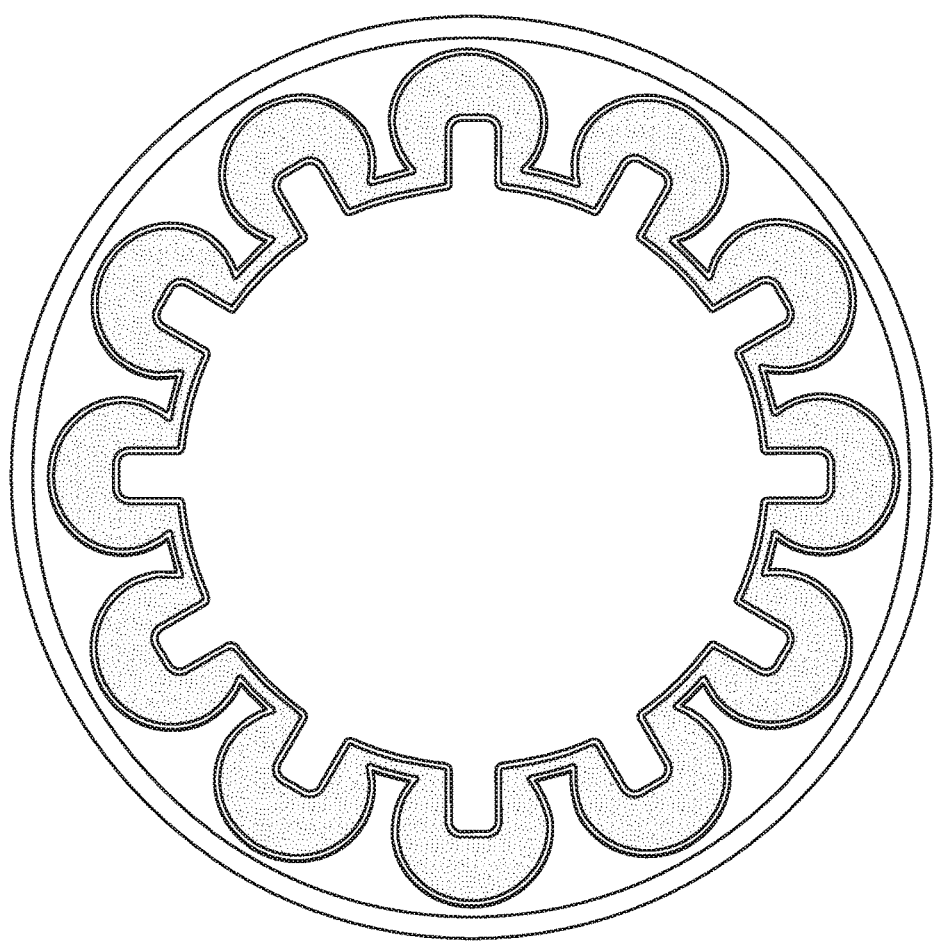
FIG. 7A is an end view of an assembly of the type shown in FIG. 7 without an end cap.

FIGS. 6, 6A, 7, and 7A illustrate the use of an end cap bulge restrictor 77 as in FIGS. 6 and 6A as opposed to an uncapped end shown in FIGS. 7 and 7A. In FIG. 6, the end caps 77 are shown as an integral extension of the respective male 71 and female 73 portions. However, the end caps 77 may be separate components threaded or otherwise secured to the female member (as shown in FIGS. 2 and 6A) and/or the male member. The end caps 77 may extend radially toward the opposed members 71, 73 to limit the flow of elastomer 75.

As shown in FIG. 6A, the end cap 77 secured to the female splined portion 73 may cover a large percentage of the exposed elastomer 75. By way of comparison, FIG. 7A shows an assembly without an end cap.

The percentage of surface area reduction (in comparison to an unrestricted end (FIG. 7A)) determines the amount of restriction. An embodiment may have a restriction between about 1% and about 99%. Elastomer end flow restriction may limit the flow of elastomer, creating an almost constant volume to build high internal pressures. In tests comparing the embodiments of FIGS. 6A and 7A, constrained coupling ends used in the test had approximately 77% less elastomer bulge in the unit compared to the unconstrained unit, which contributed to improved performance characteristics. In embodiments, small clearances may be used to provide higher torques, while still providing enough clearance to allow relative motion and limit radial loads to other components such as bearings. Each implementation may be different depending on the operating conditions and desired performance characteristics.

In another aspect, an end cap restriction of the elastomer may be continuously variable from 0% to 100% in order to tune the stiffness of the assembly.

Figure 8:
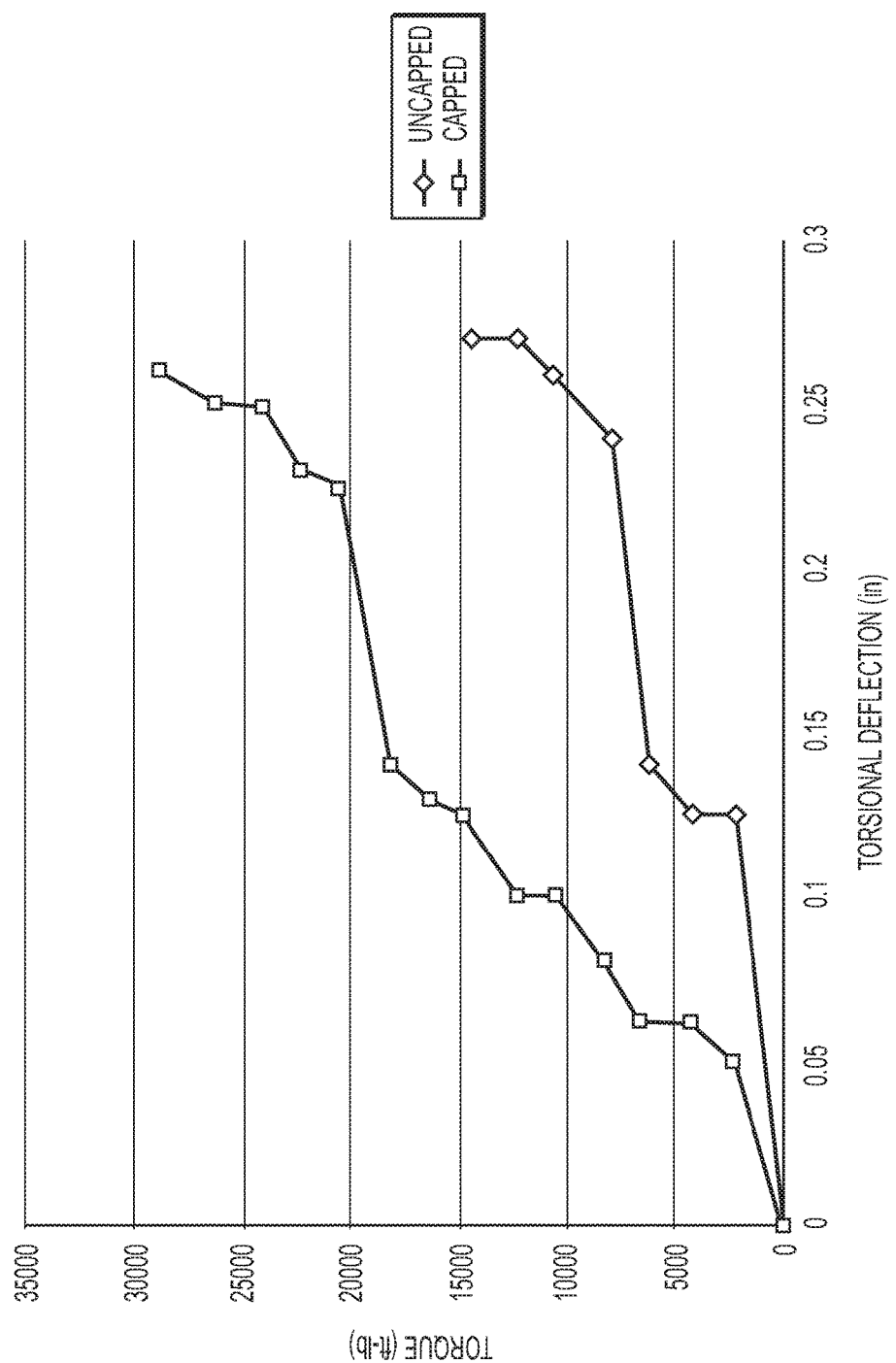
FIG. 8 is a graph of test results for torque as a function of torsional deflection for a capped assembly and an uncapped assembly, according to an embodiment.

FIG. 8 is a graph of test results for torque as a function of torsional deflection for a capped assembly and an uncapped assembly, according to an embodiment. As shown, the assembly with end caps 77 had significantly greater torque capacity in comparison to an assembly without end caps 77.

As described above and illustrated in the drawings, an aspect of the present embodiments may provide a flexible coupling for use in a rotatable device, the flexible coupling including a female member, a male member, a layer of elastically deformable material, and an end cap. The female member may have an internal surface including circumferentially spaced female splines formed thereon. The male member may have an external surface including circumferentially spaced male splines formed thereon. At least a portion of the male member may be disposed within the female member such that male splines are disposed within the female portion and the female splines and the male splines are interleaved but generally spaced apart from each other. The layer of elastically deformable material may be disposed in a space between the female splines and the male splines. The end cap may be secured to one of the female member and the male member and may extend radially toward the other member to limit flow of the elastically deformable material from the flexible coupling.

In another aspect, the male splines may be tapered in two opposing directions with respect to a centerline of the flexible coupling.

In another aspect, the end cap restriction of the elastically deformable material may be continuously variable from 0% to 100% in order to tune stiffness of the flexible coupling.

In another aspect, the female splines may define partially circular channels having a major arc section.

In another aspect, the male member and the female member may be made of metal and the elastically deformable material may be bonded to the metal.

In another aspect, the male splines may be disposed entirely within the female member.

As described above and illustrated in the drawings, another aspect of the present embodiment may provide a coupling having a first stub shaft, a second stub shaft, an intermediate shaft, and an end cap. The first stub shaft, the second stub shaft, and the intermediate shaft each have first and second longitudinal ends. The second longitudinal end of the first stub shaft may be pivotably connected to the first longitudinal end of the intermediate shaft and the first longitudinal end of the second stub shaft may be pivotably connected to the second longitudinal end of the intermediate shaft. The pivotable connection between the first stub shaft and the intermediate shaft and the pivotable connection between the second stub shaft and the intermediate shaft may be provided by a joint assembly that includes a male member having a male splined portion and a female member having a female splined portion. The male splined portion may be interleaved with and spaced from the female splined portion. A compressible elastomer may fill a space between the male splined portion and the female splined portion. The end cap may be secured to one of the female member and the male member, and may extend radially toward the other member to limit flow of the compressible elastomer through a space between the end cap and the intermediate shaft.

In another aspect, male splines of the male splined portion may be tapered in two opposing directions with respect to a centerline of the coupling.

In another aspect, female splines of the female splined portion may define partially circular channels having a major arc section.

In another aspect, the male member and the female member may be made of metal and the compressible elastomer may be bonded to the metal.

In another aspect, the coupling may be provided in combination with a progressive cavity pump having a rotor and stator and a motor for driving the pump, whereby the coupling transmits rotation of the motor into orbiting and rotation of the rotor.

As described above and illustrated in the drawings, another aspect of the present embodiments may provide an elastomeric joint adapted for mounting a component independent of a drill string. The elastomeric joint may include an outer sleeve member having a central axis, an inner sleeve member, an elastomeric material, and an end cap. The inner sleeve member may be disposed within and substantially concentric with the outer sleeve member, and the outer and inner sleeve members may be spaced apart. The elastomeric material may be disposed between the outer and inner sleeve members. The outer sleeve member may have an interior surface with female splines formed therein, and the inner sleeve member may have an exterior surface with male splines formed thereon. The inner sleeve member may be received into the outer sleeve member such that the female splines and the male splines are interleaved but spaced apart from each other by the elastomeric material. The female splines and the male splines may cooperate so as to transmit torque by compressing the elastomeric material. The end cap may be secured to one of the outer sleeve member and the inner sleeve member, and may extend radially toward the other sleeve member to limit flow of the elastomeric material. An interior of the inner sleeve member may be constructed and arranged to receive and hold a component independent of the drill string, thereby providing at least one of shock, vibration, electrical, and acoustical isolation of the component relative to an exterior environment.

In another aspect, the male splines may be tapered in two opposing directions with respect to a centerline of the joint.

In another aspect, the female splines may define partially circular channels having a major arc section, In another aspect, the inner sleeve member and the outer sleeve member may be made of metal and the elastomeric material may be bonded to the metal.

As described above and illustrated in the drawings, another aspect of the present embodiments may provide a progressive cavity device having a housing structure, a stator, a rotor, a first stub shaft, a first joint assembly, an intermediate shaft, a second joint assembly, and a second stub shaft. The stator may have a longitudinal axis. The rotor may have a true center and may be located within the stator. The stator and the rotor each may have coasting helical lobes that are in contact with one another at any transverse section, and the stator may have one more helical lobe than the rotor such that a plurality of cavities is defined between the rotor and the stator. The rotor may be adapted to rotate within the stator such that the true center of the rotor orbits the axis of the stator, the orbit having a predetermined radius, and the orbiting motion of the rotor causing a progression of the cavities in a direction of the longitudinal axis of the stator. The first stub shaft may have a longitudinal axis and first and second longitudinal ends, and the first end of the first stub shaft may be connected to and movable with the rotor. The first joint assembly may be fixed to the second end of the first stub shaft. The first joint assembly may include a first male member having outwardly extending first splines formed therefrom, a first female member having inwardly extending first splines formed therein, the first splines of the first male member being interleaved with the first splines of the first female member but spaced from one another, a first elastomer filling the space between the interleaved first splines so that the first male member and the first female member are pivotable with respect to one another, and a first end cap secured to one of the first female member and the first male member and extending radially to limit flow of the first elastomer. The intermediate shaft may have first and second ends, and the first end of the intermediate shaft may be fixed to the first joint assembly. The second joint assembly may have first and second ends, and the first end of the second joint assembly may be connected to the second end of the intermediate shaft. The second joint assembly may include a second male member having outwardly extending second splines formed therefrom, a second female member having inwardly extending second splines formed therein, the second splines of the second male member being interleaved with the second splines of the second female member but spaced from one another, a second elastomer filling the space between the interleaved second splines so that the second male member and the second female member are pivotable with respect to one another, and a second end cap secured to one of the second female member and the second male member and extending radially to limit flow of the second elastomer. The second stub shaft may have first and second longitudinal ends and a longitudinal axis that is substantially collinear with the longitudinal axis of the stator. The second stub shaft may be rotatably mounted about its longitudinal axis within the housing structure. The first longitudinal end of the second stub shaft may be fixed to the second end of the second joint assembly. The second longitudinal end of the second stub shaft may be connected to a rotatable shaft. The first and second stub shafts may be coupled such that in response to flow of fluid through the stator, the first stub shaft can rotate about its axis and orbit about the axis of the second stub shaft at the same time the second stub shaft rotates about its longitudinal axis so as to cause rotation of the rotatable shaft.

In another aspect, the first stub shaft may be integrally formed as one piece with the rotor.

In another aspect, the progressive cavity device may be combined with a drill bit operatively connected to and driven by the rotatable shaft such that the device is adapted to operate as a drive train.

In another aspect, the progressive cavity device may be combined with a motor for driving the rotor such that the device is adapted to operate as a pump.

In another aspect, the first elastomer may be bonded to the first male member and the first female member.

Finally, it should be understood that the joint assembly described herein can also be used with a progressive cavity drive train that is used as a pump. Such devices using the joint assembly of the present embodiments can be designed to have an extremely small diameter. Among the many surprising benefits of the present embodiment are: high torque and thrust capability resulting from the large area over which shear occurs; fail-safe construction whereby the male and female threaded portions thread themselves together in the absence of elastomer; complete isolation of the moving parts to eliminate sliding and consequent wear (resulting in improved durability); and deflection that occurs with relatively little force.

The foregoing disclosure of the present embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure. The scope of the present embodiments is to be defined only by the claims appended hereto, and by their equivalents.

Further, in describing representative embodiments, the specification may have presented methods and/or processes as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to methods and/or processes should not be limited to the performance of their steps in the order written, and one skilled in the art can readily appreciate that the sequences may be varied.

What is claimed is:

1. A flexible coupling comprising:
   a female member defining a plurality of radially spaced female splines extending generally in a longitudinal direction;
   a male member defining a plurality of radially spaced male splines extending generally in the longitudinal direction,
   wherein at least a portion of a first male spline is disposed in a corresponding first female spline, with the first male spline spaced apart from the first female spline so as to define a space extending generally in the longitudinal direction;
   an elastically deformable material disposed in the space between the first male spline and the first female spline,
   wherein a portion of the elastically deformable material faces longitudinally outward at a longitudinal end of the female member; and
   an end cap secured to one of the female member or the male member and extending toward the other of the female member or the male member in a direction generally lateral to the longitudinal direction,
   wherein the end cap covers at least a part of the outwardly facing portion of the elastically deformable material, to limit flow of the elastically deformable material from the space, and
   wherein the first female spline defines a partially circular channel having a major arc section that is greater than 180 degrees.

2. The flexible coupling of claim 1, wherein the end cap is threaded to at least one of the female member or the male member.

3. The flexible coupling of claim 1, wherein the end cap is an integral extension of the one of the female member or the male member to which the end cap is secured.

4. The flexible coupling of claim 1, wherein the first male spline is tapered in two opposing directions with respect to a centerline of the flexible coupling.

5. The flexible coupling of claim 4, wherein the first male spline is tapered in two opposing directions with respect to a centerline of the flexible coupling, and
   wherein the elastically deformable material is thicker at opposed ends of the first male spline than at a middle portion of the first male spline between the opposed ends.

6. The flexible coupling of claim 1, wherein the plurality of radially spaced male splines is disposed entirely within the female member.

7. A flexible coupling comprising:
   a female member defining a plurality of radially spaced female splines extending generally in a longitudinal direction;
   a male member defining a plurality of radially spaced male splines extending generally in the longitudinal direction,
   wherein at least a portion of a first male spline is disposed in a corresponding first female spline, with the first male spline spaced apart from the first female spline so as to define a space extending generally in the longitudinal direction;
   an elastically deformable material disposed in the space between the first male spline and the first female spline, wherein a portion of the elastically deformable material faces longitudinally outward at a longitudinal end of the female member; and an end cap secured to one of the female member or the male member and extending toward the other of the female member or the male member in a direction generally lateral to the longitudinal direction, wherein the end cap covers at least a part of the outwardly facing portion of the elastically deformable material, to limit flow of the elastically deformable material from the space, and wherein the male member and the female member are made of metal and the elastically deformable material is bonded to the metal of the male member and to the metal of the female member.

8. A flexible coupling comprising:

a female member made of metal and defining a plurality of radially spaced female splines extending generally in a longitudinal direction;

a male member made of metal and defining a plurality of radially spaced male splines extending generally in the longitudinal direction, wherein at least a portion of a first male spline is disposed in a corresponding first female spline, with the first male spline spaced apart from the first female spline so as to define a space extending generally in the longitudinal direction; and an elastically deformable material disposed in the space between the first male spline and the first female spline and bonded to the metal of the first male spline and to the metal of the first female spline.

9. The flexible coupling of claim 8, wherein the first male spline is tapered in two opposing directions with respect to a centerline of the coupling, and wherein the elastically deformable material is thicker at the opposed ends of the first male spline than at a middle portion of the first male spline between the opposed ends.

10. The flexible coupling of claim 8, wherein, when viewed in a cross-section taken perpendicular to the longitudinal direction, the first female spline defines an opening through which the first male spline is disposed, and wherein, when viewed in the cross-section, a maximum width of the elastically deformable material is wider than the opening.

11. The flexible coupling of claim 10, wherein, when viewed in the cross-section, the first female spline defines a partially circular channel and the opening is an arc section that is less than 180 degrees.

12. The flexible coupling of claim 8, wherein a portion of the elastically deformable material faces longitudinally outward at a longitudinal end of the female member, wherein the flexible coupling further comprises an end cap secured at an end of the flexible coupling to one of the female member or the male member, and wherein the end cap covers at least a part of the outwardly facing portion of the elastically deformable material, to limit flow of the elastically deformable material from the space.

13. A flexible coupling comprising:

an outer sleeve member defining a plurality of radially spaced female splines extending generally in a longitudinal direction;

an inner sleeve member disposed within and spaced apart from the outer sleeve member, and defining a plurality of radially spaced male splines extending generally in the longitudinal direction, wherein the inner sleeve member is received into the outer sleeve member such that each male spline of the plurality of radially spaced male splines is received into, and spaced apart from, a corresponding female spline of the plurality of radially spaced female splines; and an elastomeric material disposed between the each male spline and its corresponding female spline, wherein the each male spline is tapered in two opposing directions with respect to a centerline of the flexible coupling, wherein each of the plurality of radially spaced female splines has a substantially uniform lateral cross-section along the longitudinal direction, and wherein each of the plurality of radially spaced female splines comprises a partially circular channel having a major arc section that is greater than 180 degrees.

14. The flexible coupling of claim 13, wherein, when viewed in a cross-section taken perpendicular to the longitudinal direction, each of the plurality of radially spaced male splines has a generally rectangular shape extending lengthwise into the partially circular channel of its corresponding female spline.

15. The flexible coupling of claim 13, wherein each of the plurality of radially spaced female splines comprises a channel drilled through the outer sleeve member.

16. The flexible coupling of claim 13, wherein the each male spline is made of metal and the corresponding female spline is made of metal, and wherein the elastomeric material is bonded to the metal of the each male spline and to the metal of the corresponding female spline.

17. The flexible coupling of claim 13, wherein the elastomeric material is thicker at opposed ends of the each male spline than at a middle portion of the each male spline between the opposed ends.

18. A flexible coupling comprising:

an outer sleeve member defining a plurality of radially spaced female splines extending generally in a longitudinal direction;

an inner sleeve member disposed within and spaced apart from the outer sleeve member, and defining a plurality of radially spaced male splines extending generally in the longitudinal direction, wherein the inner sleeve member is received into the outer sleeve member such that each male spline of the plurality of radially spaced male splines is received into, and spaced apart from, a corresponding female spline of the plurality of radially spaced female splines; and an elastomeric material disposed between the each male spline and its corresponding female spline, wherein the each male spline is tapered in two opposing directions with respect to a centerline of the flexible coupling, and wherein the elastomeric material is thicker at opposed ends of the plurality of radially spaced male splines than at a middle portion of the plurality of radially spaced male splines between the opposed ends.

19. The flexible coupling of claim 18, wherein the each male spline is made of metal and the corresponding female spline is made of metal, and wherein the elastomeric material is bonded to the metal of the each male spline and to the metal of the corresponding female spline.

20. The flexible coupling of claim 18, wherein each of the plurality of radially spaced female splines comprises a partially circular channel having a major arc section that is greater than 180 degrees.

* * * * *